Dec. 7, 1971 D. M. FLORY ET AL 3,625,087

STEP RATIO PARKING BRAKE CONTROL

Filed Sept. 2, 1970 3 Sheets-Sheet 1

INVENTORS
Donald M. Flory &
BY Elton S. Moyer

ATTORNEY

Dec. 7, 1971  D. M. FLORY ET AL  3,625,087

STEP RATIO PARKING BRAKE CONTROL

Filed Sept. 2, 1970  3 Sheets-Sheet 2

INVENTORS
Donald M. Flory &
BY Elton S. Moyer

D. D. McGraw
ATTORNEY

INVENTORS
Donald M. Flory &
BY Elton S. Moyer

ATTORNEY

United States Patent Office 3,625,087
Patented Dec. 7, 1971

3,625,087
STEP RATIO PARKING BRAKE CONTROL
Donald M. Flory, Arcanum, and Elton S. Moyer, Dayton, Ohio, assignors to General Motors Corporation, Detroit, Mich.
Filed Sept. 2, 1970, Ser. No. 68,902
Int. Cl. G05g 1/04
U.S. Cl. 74—518                                   3 Claims

ABSTRACT OF THE DISCLOSURE

A variable ratio force multiplying parking brake control mechanism wherein a pedal lever having output means attached thereto is pivotally mounted on a main lever which is in turn pivotally mounted on a stationary bracket. A pretensioned spring holds the main lever while the pedal lever pivots thereon to provide relatively low force multiplication for fast takeup of the slack in the brake system. The reaction of the brake cable tensioning force causes the pretensioned spring to yield, and the resulting pivotal movement of the main lever engages a clutch acting between the main lever and the pedel lever so that upon further pedal lever movement the pedal lever and the main lever rotate unitarily about the main lever pivot to provide continuously increasing force multiplication.

---

This invention relates to a brake control mechanism and more particularly to a variable ratio force multiplying parking brake mechanism.

It is desirable in a vehicle brake control mechanism and especially in a parking and emergency brake system to provide a high degree of force multiplication for brake actuation and to keep the pedal travel required to attain the necessary multiplication at a minimum. It is therefore desirable to have low force multiplication during an initial increment of pedal actuation so that the slack in the cable apply system and in the wheel brakes can be taken up with a minimum of pedal travel. Then as the brakes are being applied, it is desirable to provide continuously increasing force multiplication in order to provide the increasing force which is required to apply the brakes. The present invention provides low force multiplication up to a predetermined pedal force to take up the slack in the brake system, and provides continuously increasing force multiplication during progressive brake applying movement of the brake pedal lever.

A brake pedal lever is pivotally mounted on a main lever which is in turn pivotally mounted on the stationary bracket of the control mechanism. The brake cable is attached to the brake pedal lever. A pretensioned spring holds the main lever against a stop so that during slack takeup movement of the pedal lever, the main lever remains stationary while the brake pedal lever pivots about its connection to the main brake lever. When the tension in the brake cable increases as the brake application progresses, the reaction of the cable tensioning force causes the pretensioned spring to yield. As the pretensioned spring yields, the main lever rotates on the bracket. This movement of the main lever relative to the bracket causes engagement of a clutch which locks the main lever to the pedal lever so that upon further pedal lever movement the pedal lever and the main lever rotate unitarily about the pivotal attachment of the main lever on the stationary bracket. The pivotal attachments are located so that the initial movement of the brake pedal lever results in a relatively low force multiplication and the unitary movement of the pedal lever and the main lever results in a continuously increasing mechanical advantage.

Figure 1:
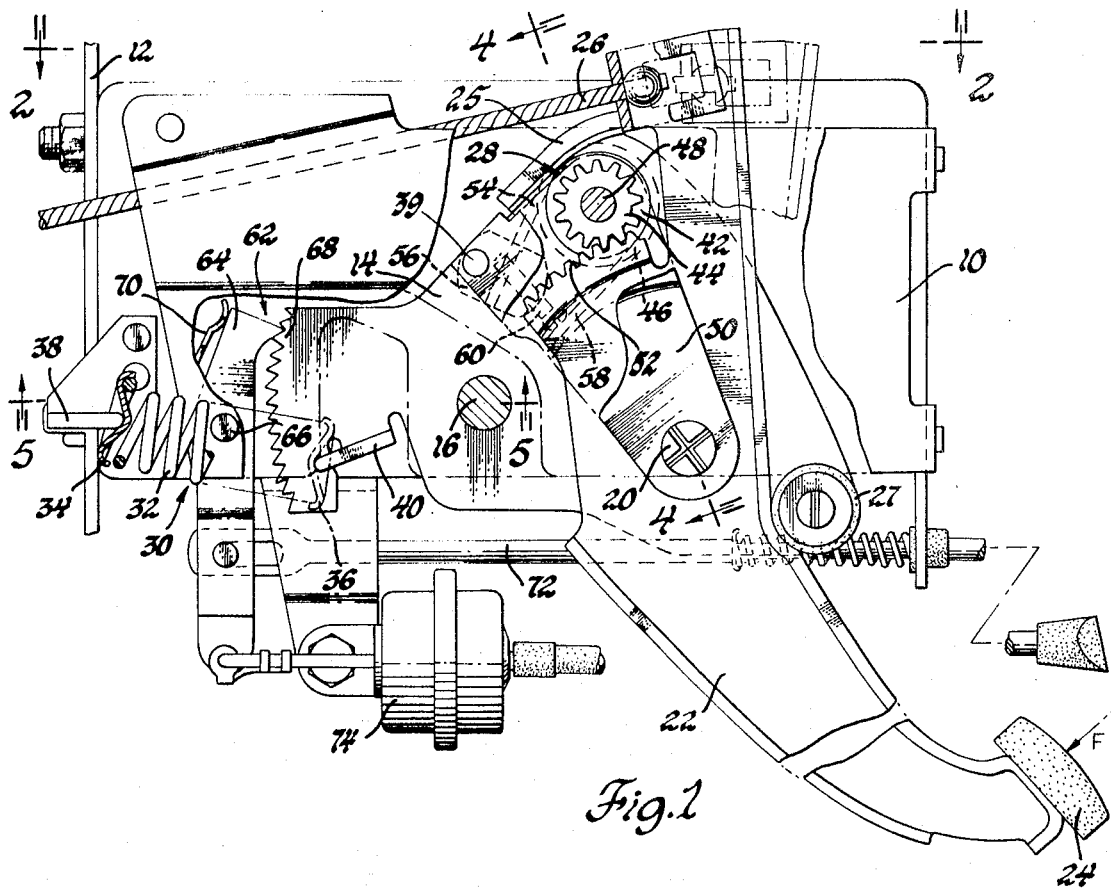
FIG. 1 is a sectional view of the step ratio parking brake control shown in the brake released position and having parts broken away and in section.

Referring to FIG. 1, bracket 10 forms the stationary frame member of the step ratio parking brake control and is suitably affixed to the vehicle fire wall 12. Pivot 16 pivotally attaches the main lever 14 to the bracket 10. Pivot 20 pivotally attaches pedal lever 22 to the main lever 14. The operator actuable pedal 24 is attached to one end of the pedal lever 22. The cable 26 is attached to the other end of pedal lever 22 and is supported during tensioning by guide 25, which is attached to main lever 14. Pivot 20, pedal 24 and cable 26 are spaced so that pivotal movement of pedal lever 22 about pivot 20 provides relatively low multiplication of the input force applied to the pedal 24. Pivot 16 is located relative to pedal 24, pivot 20, cable 26, and guide 25 so that unitary pivotal movement of pedal lever 22 and main lever 14 about pivot 16 provides continuously increasing force multiplication.

Figure 2:
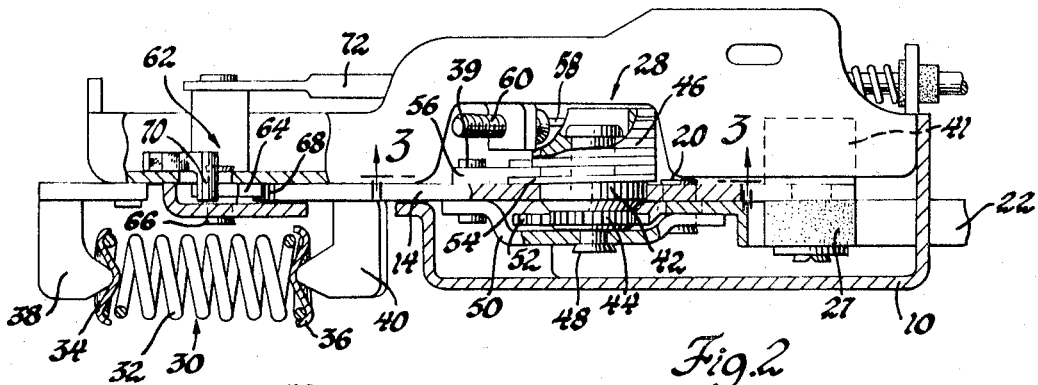
FIG. 2 is a cross-sectional view if the step ratio parking brake control of FIG. 1 taken in the direction of arrows 2—2 and having parts broken away and in section.
Figure 3:
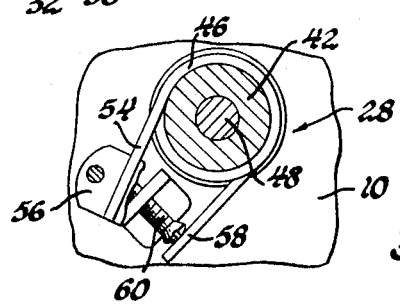
FIG. 3 is a fragmentary cross-sectional view of the step ratio parking brake control taken in the direction of the arrows 3—3 in FIG. 2.
Figure 4:
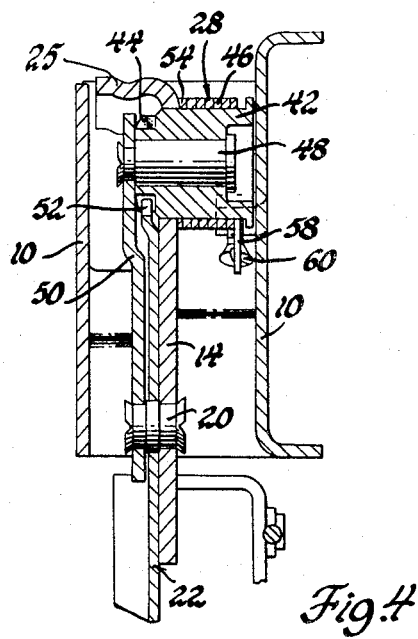
FIG. 4 is a cross-sectional view of the step ratio parking brake control of FIG. 1 taken in the direction of arrows 4—4.
Figure 5:
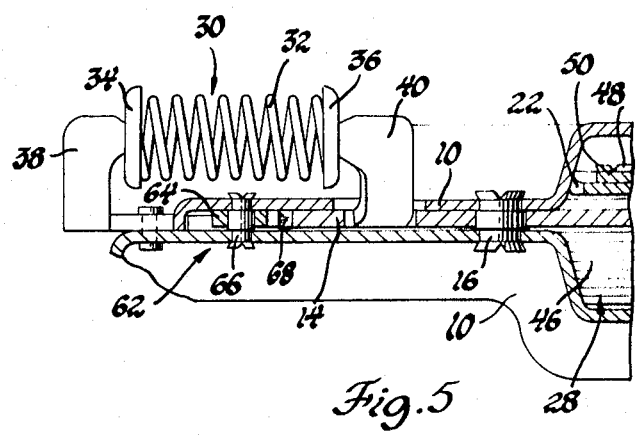
FIG. 5 is a cross-sectional view of the step ratio parking brake control of FIG. 1 taken in the direction of arrows 5—5.

Clutch assembly 28 and spring assembly 30 cooperate to shift the brake applying movement of pedal lever 22 from the low force multiplication pivot 20 to the continuously increasing force multiplication pivot 16. Referring to FIG. 1, spring assembly 30 consists of spring 32, end caps 34 and 36 which engage the ends of spring 32, and locaters 38 and 40 which are respectively mounted on bracket 10 and main lever 14 and engage end caps 34 and 36 respectively. Spring 32 is pretensioned so that as shown in FIG. 1 it biases the main lever 14 to its brake released position. This brake released position of the main lever 14 is defined by stop 41, which is attached to the main lever 14 and abuts the bracket 10. Clutch assembly 28, best shown in FIGS. 2, 3 and 4, includes drum 42, gear 44 and clutch spring 46. Pivot 48 pivotally attaches drum 42 to the mounting bracket 50 which is attached to main lever 14 at pivot 20 and rivet 39. Gear 44 is attached to drum 42 and meshes with teeth 52 which are formed in a segment of pedal lever 22 which is arcuate about pivot 20. Spring clutch 46 encircles drum 42 and has an arm 54 which is attached to main lever 14 by clamp 56 and a second arm 58 which abuts adjustable stop 60 which is attached to the bracket 10. In the brake release position as shown in FIG. 1, the clutch assembly 28 is disengaged since the arms 54 and 58 are located sufficiently apart to prevent diametrical interference between the drum 42 and the portion of the clutch spring 46 which encircles the drum 42. With the clutch assembly 28 disengaged, the pedal lever 22 can pivot about 20, but when the clutch assembly 28 is engaged, the pedal lever 22 is locked to the main lever 14 so that the pedal lever 22 and main lever 14 rotate unitarily about pivot 16.

The pawl assembly 62 locks the brake control in the brake applied position and is releasable to unlock the parking brake control. Referring to FIG. 1, pawl assembly 62 includes pawl 64 which is pivotally attached to the bracket 10 by pivot 66, ratchet teeth 68 which are formed on main lever 14, and spring tang 70 which is mounted on bracket 10 and urges pawl 64 into engagement of ratchet teeth 68. Pawl 64 and ratchet teeth 68 are arranged so that the main lever 14 can rotate in the brake applying direction only. Release handle 72 and vacuum motor 74 are provided an alternate means of urging the pawl 64 out of engagement with the ratchet teeth 68 of the lever 14 so that the vehicle operator can release the parking brake.

Figure 7:
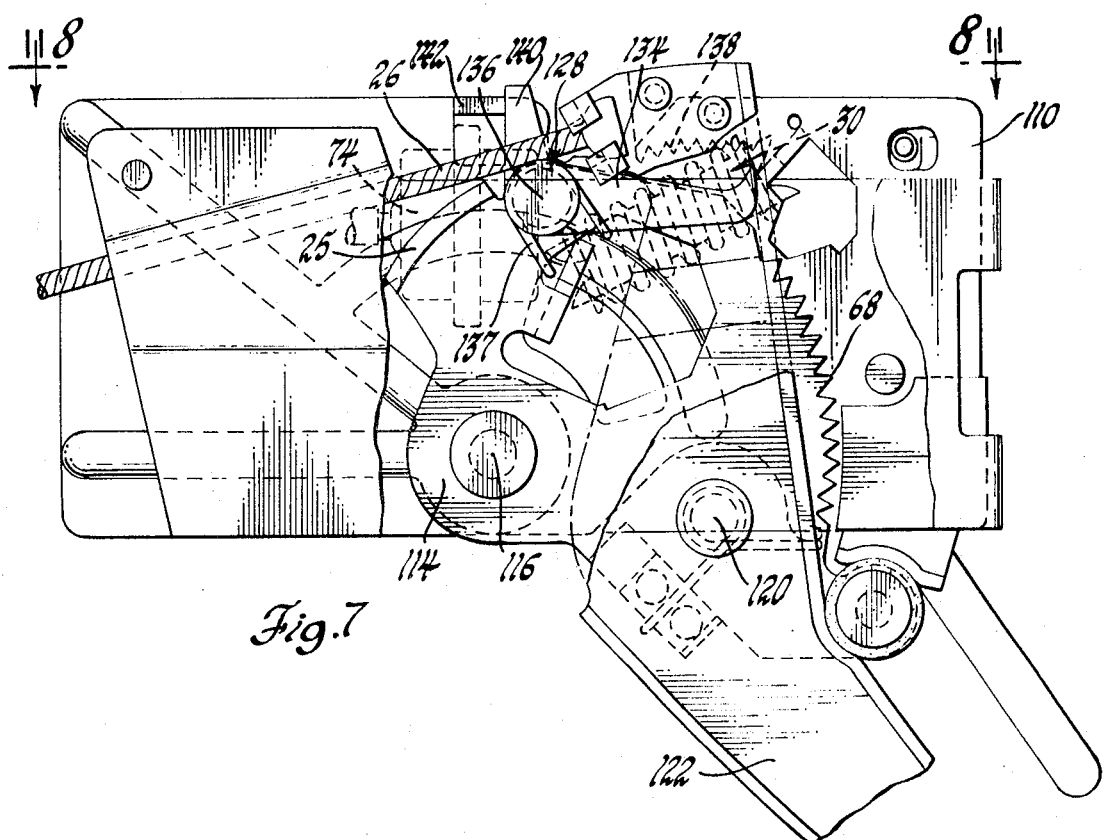
FIG. 7 is a fragmentary sectional view of a second embodiment of the invention shown in the brake released position and having parts broken away and in section.
Figure 8:
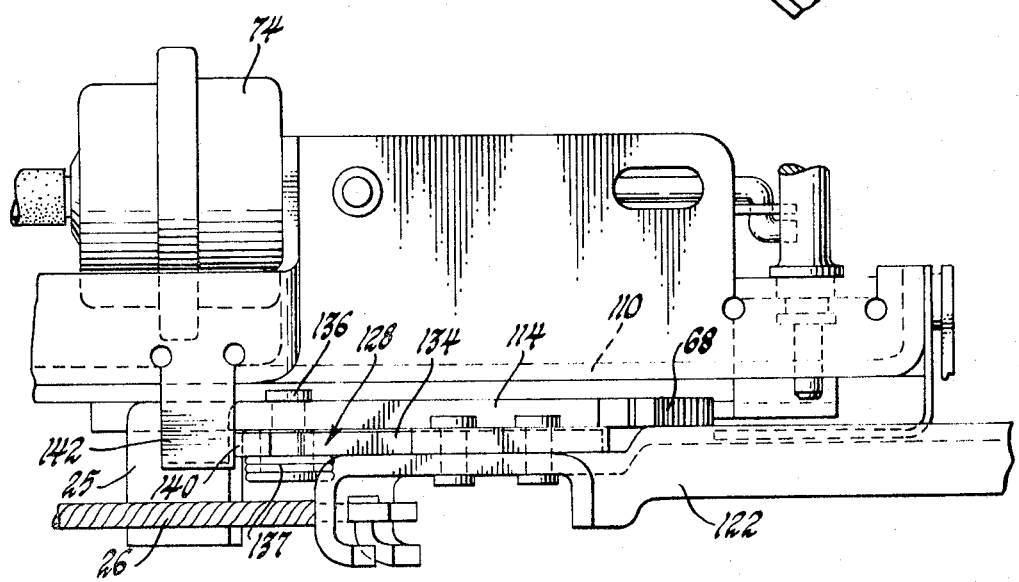
FIG. 8 is a cross-sectional view of the step ratio parking brake control of FIG. 7 taken in the direction of arrows 8—8.

A second embodiment of the invention is shown in FIG. 7. The embodiment of FIG. 7 is generally identical to that of FIG. 1 with the exception of clutch assembly 128. The same reference numerals are therefore used for the common structural elements, and these elements will not be again described in detail. Clutch assembly 128, acting between main lever 114 and pedal lever 122, includes pawl 134 which is pivotally attached to main lever 114 at pivot 136. Spring 137 is seated at main lever 114 and urges pawl 134 into engagement of ratchet teeth 138 formed on pedal lever 122. In the rest position, as shown in FIG. 7, an abutment 140 of pawl 134 engages a stop 142 attached to bracket 110 to hold pawl 134 out of engagement with ratchet teeth 138. With the clutch assembly 128 disengaged as shown in FIG. 7, the pedal lever 122 can pivot about pivot 120, but when the clutch assembly 128 is engaged the pedal lever 122 is locked to the main lever 114 so that the pedal lever 122 and main lever 144 rotate unitarily about pivot 116.

OPERATION

Referring to FIG. 1, the step ratio parking brake mechanism is shown in the brake released position. Spring assembly 30 biases the stop 41 mounted on main lever 14 into engagement with bracket 10. The small amount of tension in cable 26 urges pedal lever 22 against stop 27. Clutch assembly 28 is disengaged since the arms 54 and 58 are held apart by adjustable stop 60, thereby allowing drum 42 and gear 44 to rotate freely.

Figure 6:
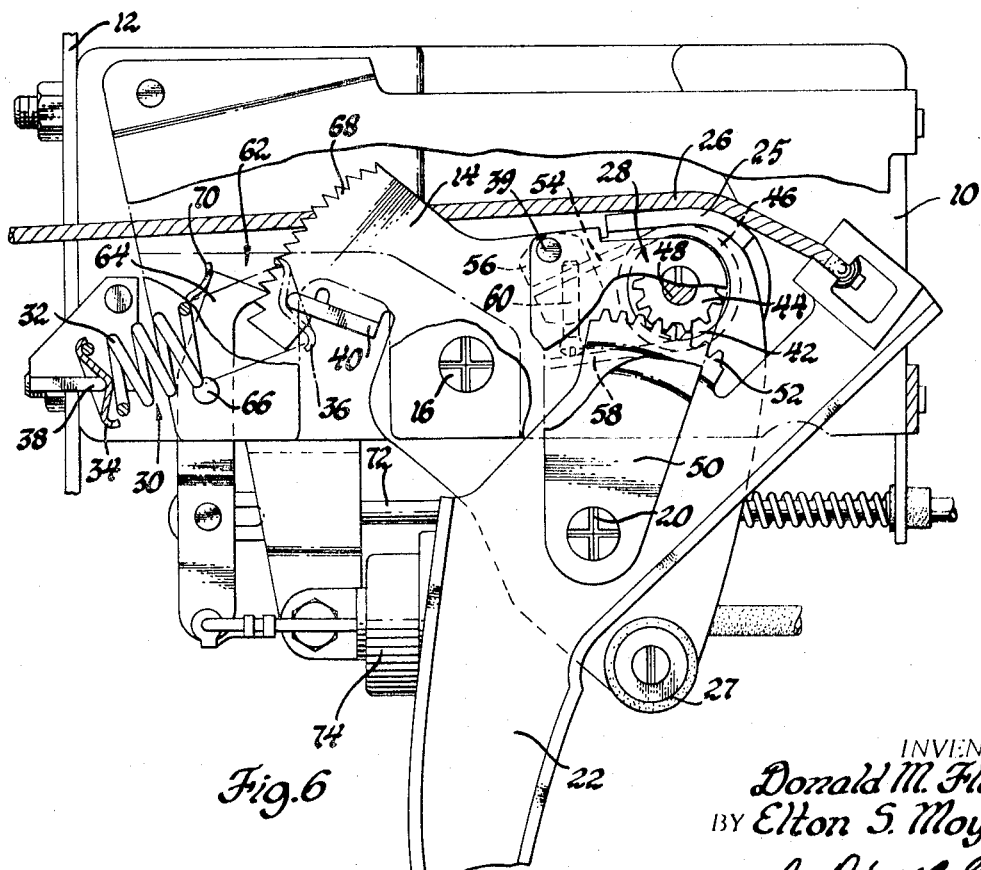
FIG. 6 is a sectional view of the step ratio parking brake control of FIG. 1 shown in the brake applied position and having parts broken away and in section.

The operator applies the brake by providing an input force against pedal 24 causing pedal lever 22 to rotate about pivot 20. Gear 44 rotates freely and meshes in teeth 52 of the pedal lever 22 to allow movement of pedal lever 22 relative to main lever 14. This rotation of pedal lever 22 about pivot 20 allows rapid takeup of the slack in the cable 26 and in the vehicle brakes. Until the slack is removed from the system, the forces acting on pedal lever 22 provide a reaction moment about pivot 16 which is less than the moment of spring assembly 30 about pivot 16. However, when the slack is removed, the forces acting on pivot 20 increase to overcome the reaction moment of spring assembly 30 about pivot 16. When spring 30 yields, main lever 14 begins to rotate and the clutch assembly 28 which is attached to the main lever 14 rotates with main lever 14 about pivot 16. The arm 58 of the clutch spring 46 moves away from the stationary adjustable stop 60, allowing arms 54 and 58 to move closer together. As the arms 54 and 58 move closer together, the portion of clutch spring 46 which encircles drum 42 contracts to interfere diametrically therewith and thereby prevent it from rotating. The effective moment arm of the reaction force at pivot 20 increases as main lever 14 rotates about pivot 16 and urges main lever 14 to rotate faster than pedal lever 22. However, this would require drum 42 to rotate clockwise as viewed in FIG. 6. This tendency toward clockwise movement of drum 42 causes the clutch spring 46 to wind more tightly about drum 42 since arm 54 is anchored and thereby prevents relative movement between the main lever 14 and pedal lever 22. When spring assembly 30 moves over center it cooperates with the operator applied input force to provide an additional brake applying force. The engagement of the clutch assembly 28 locks the pedal lever 22 and main lever 14 together so that subsequent brake applying travel of pedal lever 22 is about pivot 16 to provide continuously increasing force multiplication. The vehicle operator is thereby given an increasing mechanical advantage with which to apply the parking brake.

The operator releases the step ratio parking brake control by actuating of the release handle 72 or the vacuum motor 74. Pawl 64 is thereby disengaged from the ratchet teeth 68 of main lever 14 allowing the tension in cable 26 to return the spring assembly 30 past the over center position as main lever 14 resumes its brake released position. As main lever 14 retrogresses about pivot 16, arm 58 of clutch spring 46 is returned to engagement of adjustable stop 60 so that the diametrical interference between drum 42 and the clutch spring 46 is removed allowing the drum 42 and attached gear 44 to rotate. Rotation of the gear 44 allows pedal lever 22 to return to its initial brake released position.

Operation of the second embodiment of the invention, as shown in FIG. 7, is generally similar to that of the embodiment of FIG. 1. The initial rotation of pedal lever 122 is about pivot 120 to allow rapid takeup of slack in the cable 26 and in the vehicle brakes. When the forces acting on pivot 120 increases sufficiently to overcome the reaction moment of the spring assembly 30 about pivot 116, the main lever 114 begins to rotate carrying pawl 134 away from stop 142 of the frame 110. As main lever 144 rotates, spring 137 urges pawl 134 toward engagement of ratchet teeth 138. When pawl 134 engages ratchet teeth 138, main lever 114 and pedal lever 122 are effectively connected so that subsequent brake applying travel of pedal lever 122 is about pivot 116 to provide continuously increasing force multiplication giving the vehicle operator an increasing mechanical advantage with which to apply the parking brake.

While in the embodiments of the invention disclosed in the drawings, the guide 25 supports cable 26 in such a manner as to provide a continuously increasing force multiplication as pedal lever 22 and main lever 14 rotate unitarily about pivot 16, it is within the scope of this invention to provide a cable guide which is arcuate about the pivot 16 so as to provide a constant force multiplication during brake applying pedal movement about pivot 16.

Thus, the step ratio parking brake control mechanism of this invention provides fast slack takeup until a predetermined pedal force is reached, and subsequent relatively higher force multiplication to provide the force necessary to actuate the brakes.

What is claimed is:
1. A brake control assembly comprising:
   a bracket;
   a main lever;
   first pivot means pivotally mounting said main lever on said bracket for movement about a first axis;
   a pedal lever having spaced force input and force output means and a central portion therebetween;
   second pivot means pivotally mounting said central portion of said pedal lever on said main lever for relative movement therebetween about a second axis spaced from said first axis;
   clutch means acting between said main lever and said pedal lever, said clutch means being disengageable to allow movement of said pedal lever about said second axis to provide a relatively low force multiplication between said force input and said force output means;
   prestressed spring means engaging said bracket and said main lever and urging said main lever to an initial position relative to said bracket, said prestressed spring means yielding in response to a pre- determined force applied to said main lever by said pedal lever and going over center to provide an additional brake applying force input, said yielding of said prestressed spring means allowing movement of said main lever about said first axis and consequent engagement of said clutch means thereby locking said pedal lever and said main lever so that upon subsequent rotary movement of said pedal lever, said main lever travels therewith about said first axis to provide a relatively higher force multiplication.

2. The brake control of claim 1 further characterized by said clutch means comprising:
   teeth formed on said pedal lever in a segment thereof being arcuate about said second axis;
   a drum;
   a third pivot means rotatably mounting said drum on said main lever;
   a gear attached to said drum and meshing with said teeth of said pedal lever upon relative movement between said pedal lever and said main lever;
   a clutch spring having a central portion encircling said drum and diametrically interfering therewith; a first arm being an end portion of said central portion and extending therefrom into attachment with said main lever, and a second arm being the other end portion of said central portion and extending tangentially therefrom; and
   stop means attached to said bracket, said stop means engaging said second arm of said clutch spring when said main lever is at said initial position thereof and holding said second arm substantially radially apart from said first arm to eliminate said diametrical interference so that said drum rotates freely to allow movement of said pedal lever about said second axis.

3. The brake control of claim 1 further characterized by said clutch means comprising:
   ratchet teeth formed on said pedal lever;
   a pawl having a tooth and an abutment;
   a third pivot means rotatably mounting said pawl on said main lever;
   spring means seated at said main lever and urging said pawl into engagement of said ratchet teeth;
   and stop means attached to said bracket and engaging said abutment of said pawl when said main lever is at said initial position thereby holding said pawl out of engagement of said ratchet teeth to allow movement of said pedal lever about said second axis.

References Cited

UNITED STATES PATENTS 2,975,654  3/1961  Vigmostad _____ 74—516 X
3,487,716  1/1970  Hirst, Jr. _____ 74—516

MILTON KAUFMAN, Primary Examiner

R. C. CAPOSSELA, Assistant Examiner

U.S. Cl. X.R.

74—512